Nov. 29, 1960 E. W. HOFFMEISTER 2,961,926
REFLECTIVE DEVICES HAVING MULTI-CURVED SURFACES
Filed March 8, 1955 3 Sheets-Sheet 1

INVENTOR.
ERNST W. HOFFMEISTER
BY
ATTORNEY

Nov. 29, 1960   E. W. HOFFMEISTER   2,961,926
REFLECTIVE DEVICES HAVING MULTI-CURVED SURFACES
Filed March 8, 1955   3 Sheets-Sheet 2
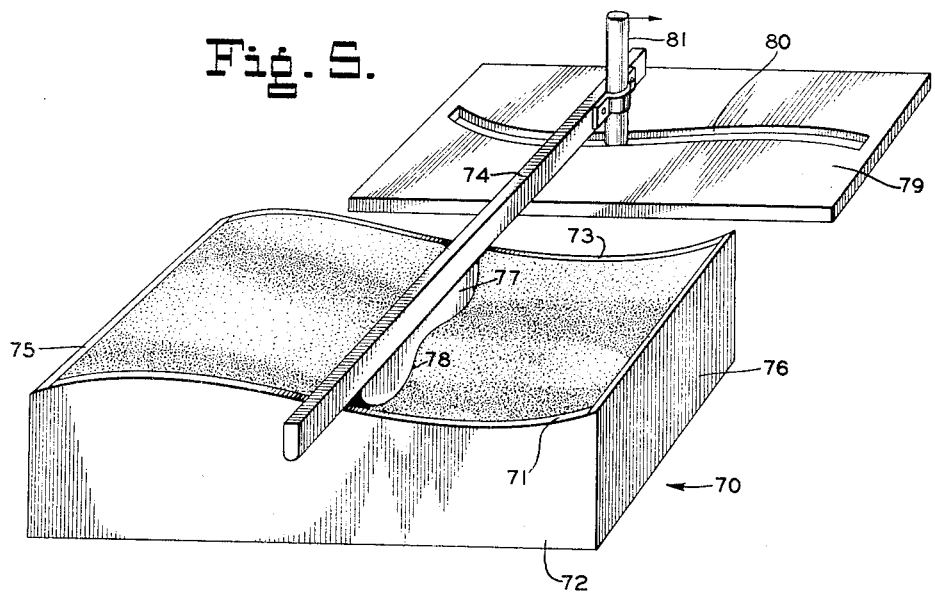
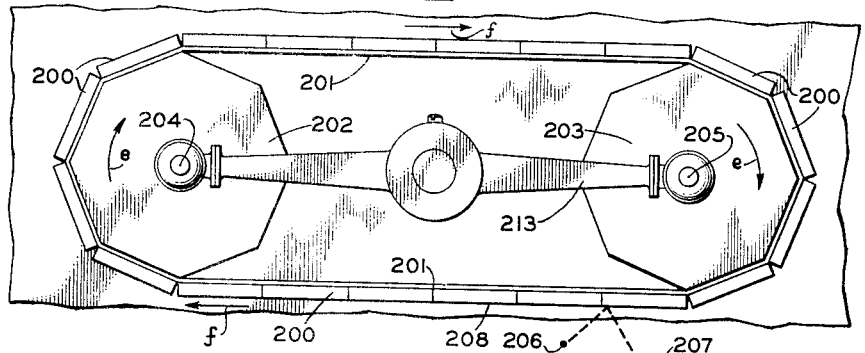
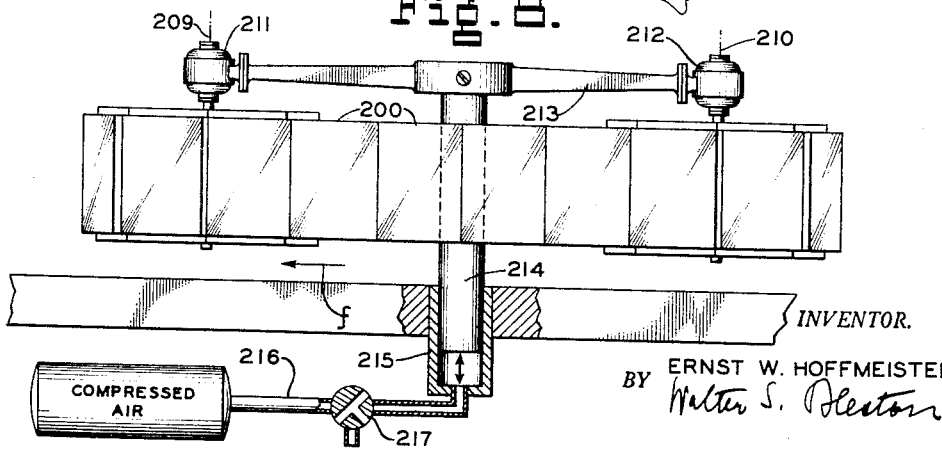
INVENTOR.
ERNST W. HOFFMEISTER
BY Walter S. Heaton
ATTORNEY Nov. 29, 1960  E. W. HOFFMEISTER  2,961,926
REFLECTIVE DEVICES HAVING MULTI-CURVED SURFACES
Filed March 8, 1955  3 Sheets-Sheet 3

INVENTOR.
ERNST W. HOFFMEISTER
by Walter S. Sterton
ATTORNEY

United States Patent Office 2,961,926
Patented Nov. 29, 1960

2,961,926

REFLECTIVE DEVICES HAVING MULTI-CURVED SURFACES

Ernst W. Hoffmeister, 1233 Yonge St., Apt. 204,
Toronto 5, Ontario, Canada

Filed Mar. 8, 1955, Ser. No. 492,954

2 Claims. (Cl. 88—76)

The invention relates to a reflective or mirror-like device having a multi-curved surface which creates a disproportioned but sharp image of the body of a person positioned in a predetermined relationship to the reflective device. Devices of that type are used for amusement, entertainment or other purposes.

It is an object of the invention to provide a device of the mentioned kind which causes all portions of the body of a person positioned in proper relationship to the device apparently to perform movements whereby the parts seem to be subjected alternately to a shrinking and an expanding process. Such appearances may occur due to either a change of the direction of looking at the device by an observer if both the person and the device are stationary, or by a relative shift of the person and the device in respect to each other. Of course, if the observer himself takes the place of the mentioned person, his limbs, head and trunk will perform illusory movements in a similar manner.

Conventional devices for the indicated purpose consist of a reflective material with a surface having convex portions wave-like alternating with concavities. However, at least parts of the seemingly moving bodies appear not clear, indistinct or even not at all, so that the image contains empty spots or spaces, due to the failure of applying in the formation of the curvatures certain rules which I have found to be of essential importance.

Another object of the invention is, therefore, the provision of a device of the mentioned kind in which all parts of the reflected image appear absolutely clear and grotesquely alive, each apparent movement smoothly passing over into the subsequent one when the device is shifted relatively to the observed body.

Further objects and details of the invention will be apparent from the description given hereinafter and the accompanying drawing illustrating embodiments thereof by way of example.

In the drawing,

Fig. 5 is a view similar to Fig. 4 illustrating the production of a surface with 3 wave formations at different angles;

Fig. 7 is a diagrammatical top view of an endless movable band of a plurality of panes according to the invention, and Fig. 8 is a side elevation of the device according to Fig. 7.

A device according to my invention may comprise either one reflective or mirror-like element or a plurality of elements which may be alike or similar to each other. In order to make myself readily understood, I shall hereinafter and in the claims denote such element by the term "pane." Such pane may consist of a glass covered on one side as a mirror or of a polished metal if its reflective quality is utilized. It will be clear that the reflective properties of a pane can be used if an observer and the body whose reflected image is to be observed are both positioned on the same side of the pane in which event the mentioned body and the observer may be identical. A pane according to my invention has a waved surface, i.e., one of its surfaces is formed with alternating concavities and convexities, which comply with the following requirements:

(1) The wave line is formed by alternating concave and convex segments of conic sections, i.e. portions of circles, ellipses, parabolas or hyperbolas, wherein the waves may be of different curvatures, amplitudes and lengths.

(2) Each concave and convex segment must contain the vertex and the axis of its curve.

(3) The transition from a concave to a convex conic section curvature is formed by a common tangent the length of which may be between zero and the focal length of the vertex of the concave curvature.

(4) All the axes of the segments of conic sections are parallel to one another and consequently all tangents to the vertexes are parallel to one another.

(5) The focal length of a concave section must be larger than 2.1 times the object distance, i.e. the distance of the body, the image of which is to be reflected from the vertex of the concave curve.

The terms "concave" and "convex" are used in relation to the pane as seen from the side of the body, whose image is to be observed.

Furthermore, wherever in the following description and claims I use the term "wave line" I wish it to be understood as the outer contour of a cross-section through a plurality of parallel waves at right angles to the longitudinal extension of each wave, and the term "wave formation" is the surface structure of an area obtained by moving a wave line parallel to its plane over that area in the direction of the longitudinal extension of the waves.

Figure 1:
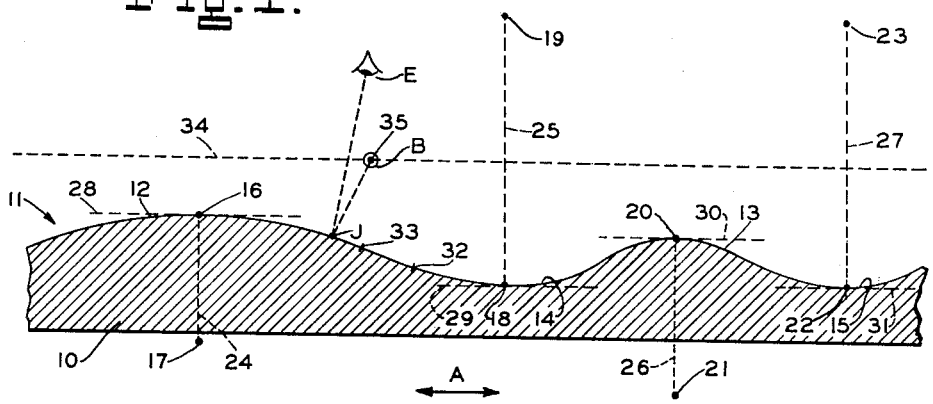
Fig. 1 is a diagrammatical cross-section of a portion of a pane with a wave extending in one direction.
Figure 2:
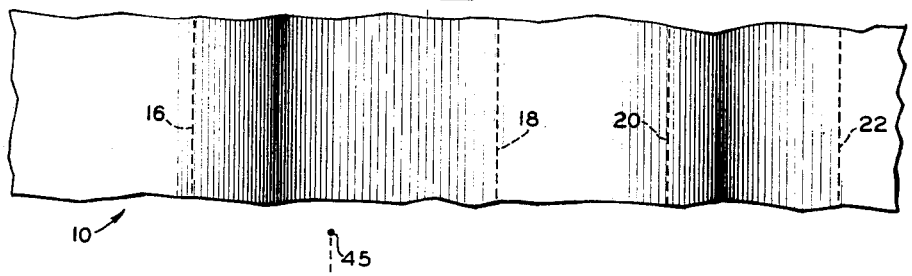
Fig. 2 is a top plan view of the pane of Fig. 1.
Figure 3:
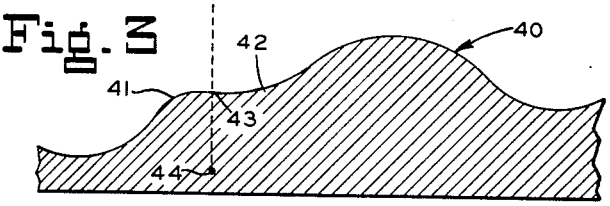
Fig. 3 is a cross-section similar to Fig. 1 of a different wave formation.

Referring now to the drawing, Fig. 1 shows the cross-section of a pane 10 with a waved surface contour or wave line 11 according to the foregoing five basic points wherein the waves are of different lengths and amplitudes. The crests 12, 13, and depressions 14, 15, i.e., the waves proper, are provided parallel to each other in one direction on the pane as clearly shown in Fig. 2. Hence, with respect to the wave formation of the pane surface, the wave line 11 is located in a plane at right angles to the direction in which the waves extend. The crest or convex portion 12 may be a segment of a parabola or any other conic segment having its vertex at 16 and its focus at 17. Similarly, the depression or concavity 14 may be a segment of e.g. a hyperbola with vertex at 18 and focus at 19. The convex portion 13 may be a part of a hyperbola with vertex at 20 and focus at 21 and the convave portion 15 may be a part of an ellipse with its vertex at 22 and focus at 23. Of course, any other sequence of conic sections may be used to produce varied effects. It is also possible, as indicated in Fig. 3, to apply in the wave formation a wave line 40 in which two different curve segments are jointed at their vertexes, as both curve segments 41 and 42 have their vertexes at 43 whereas the focus of the curve 41 is at 44 and that of the curve 42 is at 45. With reference to Fig. 1, it will be noticed that the axes 24, 25, 26, 27, i.e., the connecting lines between each focus and co-ordinate vertex are parallel to each other and at right angles to the tangents 28, 29 30, and 31 at the vertexes which are also parallel to each other. It will also be noted that the convex portion 12 and the concave portion 14 are connected between the points 32 and 33 by a portiton of a common tangent which is shorter than the focal lentgth of the concave portion, i.e., the distance between points 18 and 19. The dotted line 34 indicates approximately how far a body whose image is intended to be reflected should be spaced from the pane 10, and it will be noticed that the focal length 18, 19, and the focal length 22, 23, are more than 2.1 times the distance of the line 34 from the points 18 and 22, respectively. Thus, a pane with a surface as shown in Figs. 1 and 2 complies with all the requirements as stated hereinbefore, but it will be understood that in the actual realization of the invention all elevations will be relatively much lower and all depressions much shallower than in the diagrammatic illustration of Figs. 1 and 2. If a body B is positioned at 35 on line 34, its image will be visible at J to an observer's eye E, and if now the pane is moved to or fro in the direction of the arrow A, the image will appear strip-wise to expand and to shrink continuously and alternately.

Figure 4:
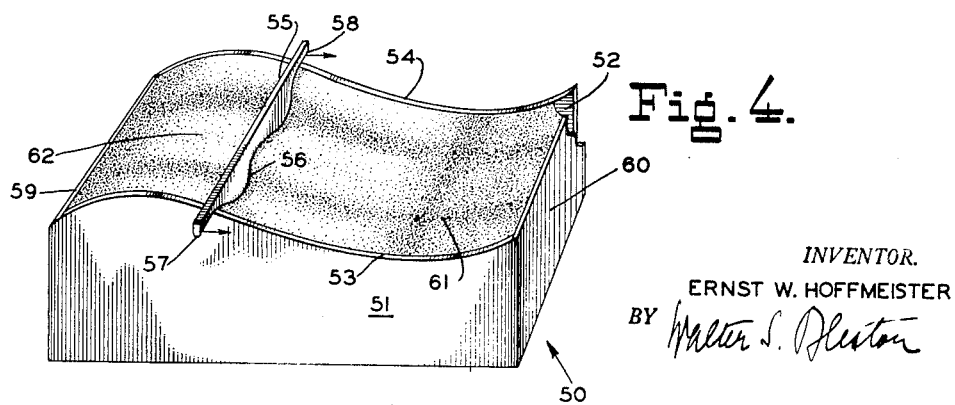
Fig. 4 is a diagrammatical perspective view illustrating a surface with two wave formations at right angles to one another.

The effect of the illusory movements of the image of a body can be greatly improved according to the invention if the surface is provided with two equal or different wave formations of the kind hereinbefore described wherein the one wave formation is superimposed at right angles to the other one. In other words, the wave lines of the second wave formation are in planes at right angles to those of the first formation and the waves of the second formation extend at right angles to the waves of the first formation. Such a superimposition would cause in certain parts an increase of the protrusion of a convexity and in other parts an increase of the depth of a concavity whereas in other parts again, the concavities and convexities will be decreased. The resulting wave formation can be readily conceived if it is assumed, as indicated in Fig. 4, that a box 50 has two opposite sides 51 and 52 with their top edges 53 and 54 shaped according to the form of the first wave line and that the box is filled with sand up to the edges 53 and 54 so that the top surface of the sand forms corresponding waves extending from the side 51 to the side 52. A board such as 55 is provided with a lower edge 56 shaped according to the second wave line. In this diagrammatic figure, the wave lines are much simplified in that merely one or two concavities or convexities of each are shown. This board bears with its ends 57 and 58 on the side edges 53 and 54, respectively, so that the edge 56 throughout its length projects downward into the sand. If, then, the board is shifted parallel to itself from the one end 59 of the box to its other end 60, edge 56 will have scraped sand off so that now the shape of the surface of the sand is the result of a superimposition of a second wave formation according to the wave line of the edge 56 to the first wave formation according to the curve lines of the edges 53 and 54. In consequence, there will be a small area of deepest depression approximately at 61 and a small area of highest elevation approximately at 62. In the so-created wave formation, the focal length with respect to the point 61 will also be more than 2.1 times the distance of the point 61 from the line on which the person to be observed will be located.

However, in the preferred form of the invention, a third wave formation is superimposed on the two wave formations just described. It will be noticed that to create the surface shown in Fig. 4, each point of the second wave line 56 moves from the end 59 to the end 60 in a straight direction parallel to the sides 51 and 52 although it moves simultaneously up and down as prescribed by the first wave line of the edges 53 and 54. The superimposition of the third wave formation can be accomplished by causing each point of the second wave to move, rather than in the mentioned straight direction along a third wave line, in a plane at right angles to the planes of the first and the second wave lines. This is diagrammatically shown in Fig. 5. In this figure a box 70 is shown similar to the box 50 in Fig. 4. The upper edge of the side 72 and the upper edge 73 of the opposite side, shaped according to the first wave line, may be considered as guide rails for the up and down movement of a bar 74 when the latter is shifted parallel to itself, from the box end 75 to the end 76. Between the edges 71 and 73, a board 77 is suspended, the lower edge 78 of which is formed according to the second wave line.

It will be noticed that the length of the board is shorter than the distance of the edges 71 and 73 from each other, so that a certain movement in the direction of the extension of bar 74 is possible. A panel 79 is located in a horizontal plane, i.e. a plane at right angles to both the planes of the first and the second wave line. The panel is provided with a guide slot 80 extending approximately as far as the distance between the mentioned ends 75 and 76 and being shaped according to the desired third wave line. A rod 81 extending vertically of the panel 79 is guided in the slot 80. A stirrup-like piece 82 is secured to the bar 74 and engages the rod 81 so that the bar can move vertically in relation to the rod 81. Now, it will be clear that when the bar 74 is shifted from the end 75 to 76, as stated hereinbefore, each point of the second wave line 78 will move not only up and down according to the first wave line defined by each of the edges 71 and 73 but will simultaneously shift transversely in accordance with the third wave line defined by the slot 80. In consequence, the surface of the sand will be shaped as the result of the superimposition upon each other of three different wave formations corresponding to three wave lines each of which occurs in a plane at right angles to the planes of the two other wave lines.

It will be understood that the example of the sand box has been used mainly to explain the shape of the surface of a reflective pane according to the invention. However, it is also possible to produce a panel according to the invention by first shaping a surface of moulding sand as just described, then placing on that surface a transparent panel while hot so that the hot panel material will closely engage the waved surface, and finally, after the material has cooled down, silver-plating the surface which was adjacent the sand. In forming the waved surface it is essential that each of the wave lines conforms to the conditions 1 to 4 stated hereinbefore and that the first and the second wave line conform also with the fifth condition. If this is the case, all the axes of the conic sections forming the mentioned first and second wave lines will be parallel to each other and the axes of the conic sections forming the third wave line will be at right angles thereto. Furthermore, the focal lengths of the vertexes of the concave portions of the two superimposed first and second wave formations are now each a function of the focal length resulting from the superimposition, and the focal lengths of the conic segment curvatures newly created by the superimposition are greater than 2.1 times the distance of the object body.

The conventional manner of illustrating a bent surface is not adequate to give an intelligible picture of a completed surface according to the invention in view of the apparent irregularities of the locations and the height of the crests and the depth of the indentations. Therefore, a special diagrammatical representation has been used in Fig. 6 which shows how the exact location of any point of the surface can be found and its depth below or height above a plane reference surface. In order to simplify the drawing, only the first wave line is shown as composed of arcs, one convex and the other concave, whereas of the second and the third wave lines only the vertexes are shown connected by straight lines.

Figure 6:
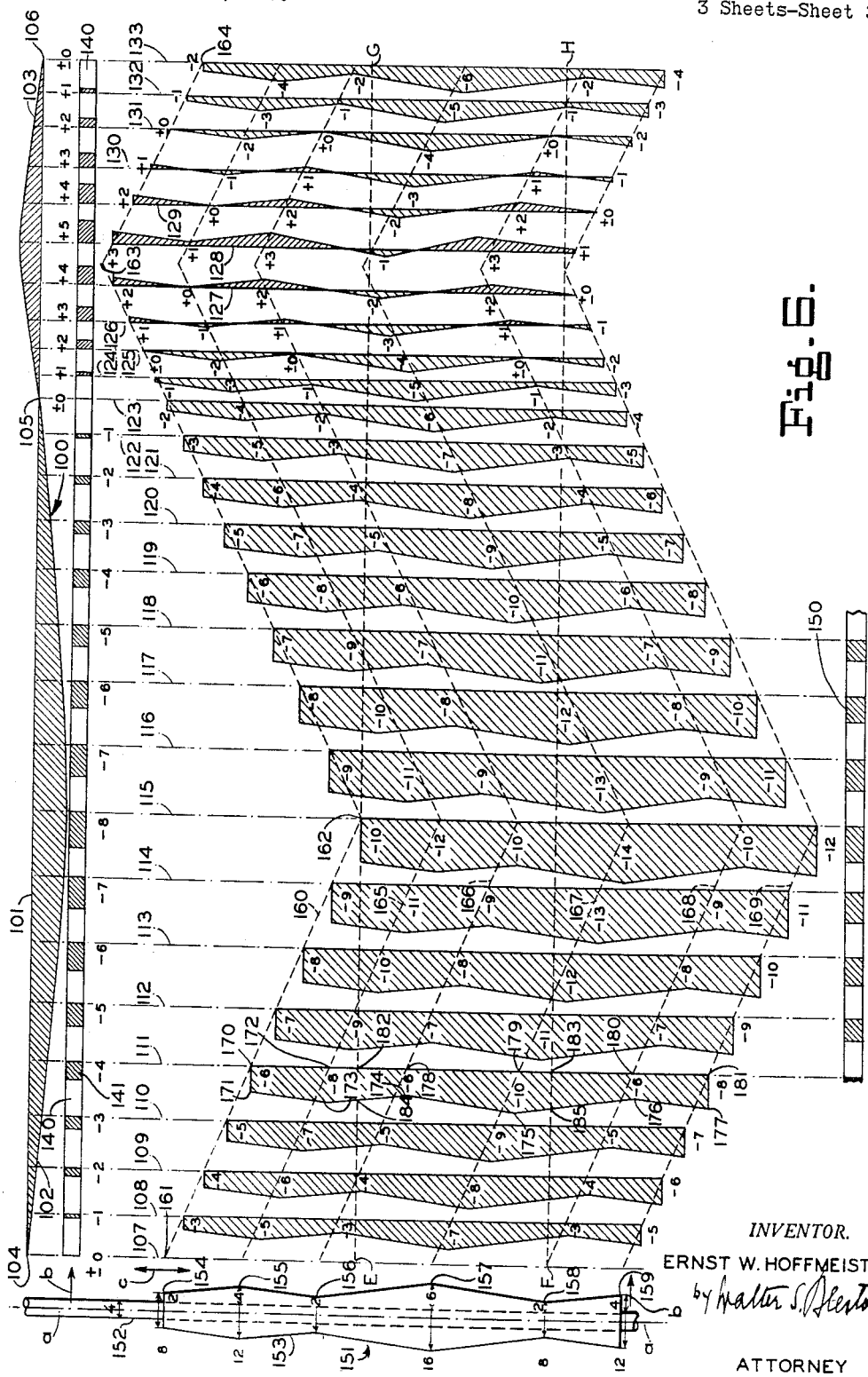
Fig. 6 is a diagram illustrating the concavities and convexities of a surface according to the invention with three differently directed wave formations.

With respect to Fig. 6, it has been assumed that an area EFGH is to be provided with a surface created by the superimposition of a second and a third wave formation on a first one. The first wave formation follows the first wave line 100 which, with reference to a base line 101, comprises one concave arc portion 102 and a convex arc portion 103. This wave line 100 is in a plane parallel and at right angles to the area sides EG and FH. There are three points 104, 105, and 106, where the lines 100 and 101 intersect, point 104 coinciding with the direction of the line EF, and point 106 coinciding with the direction of the line GH. Vertical reference lines 107, 108 . . . 133 identify points of the wave line 100 with correspondingly located cross-sections of the area EFGH. The distance of these reference lines from one another may be selected as desired. In a horizontal strip 140 underneath the wave line 100, little areas are hatched. These areas extend each from one of the reference lines a width equal to the distance of the point of line 100 identified by the reference line from the base line 101. Thus, e.g., the area 141 has a width equal to the distance of the point of intersection of lines 111 and 100 from the line 101. It will be noted that in order to indicate concavities, the mentioned areas on strip 140 extend to the left hand side and, to indicate convexities, the areas extend to the right hand side from the respective reference line. For the sake of simplifying the representation, it is assumed that the distance between the base line and the vertex of the concave portion 102 which coincides with reference line 115, is equal to eight units of a freely selected unit of length or, in other words, the mentioned distance has been divided into eight equal parts, each part considered as a unit of length in the present case. Then, again for simplifying matters, the reference lines 107, 108 . . . 133 are located where distances of points of the wave line 100 from the base line 101 are fractionless multiples of that unit of length. Thus, e.g. with respect to reference line 111, the corresponding distance is four units. The distance in units of length are applied to the areas with a negative sign in order to indicate concavities and with a positive sign in order to indicate convexities. Hence, the area 141 has the numeral —4 applied to it. Similarly, the area co-ordinate with reference line 110 has the numeral —3, the area co-ordinate with line 132 the numeral +1 whereas there is a ±0 numeral applied at the reference lines 107, 123 and 133. The strip 140 is, in fact, the top plan view of a guide rail which is curved according to the wave line 100 and the widths of the small areas as e.g. area 141 indicates the depths of the depression at the location of the co-ordinate reference line, or in the strip portion between the lines 123 and 133, the height of the convex portion above the base line 101. A similar guide rail 150 is shown at the bottom of Fig. 6. The guide rails 140 and 150 are spaced from the area sides EG and FH, respectively, for a reason which will be explained hereinafter.

On the left hand side, laterally of the area side EF and thus of reference line 107, a grinder or milling cutter 151 is shown which comprises an axle 152 and a grinding or cutting surface, the contour of which is denoted by 153. The axle 152 projects with both its ends substantial distances from the grinding surface. The contour 153 is shaped according to the second wave line, so that the cutting surface constitutes a body of rotation of the second wave line. As stated hereinbefore, the line is merely indicated by vertexes of convexities and concavities, connected by straight lines. Six such vertexes 154, 155, 156, 157, 158 and 159 are visible. The axle 152 is shown with a diameter of four units. At point 154 the diameter of the grinding surface is eight units so that point 154 projects two units from the periphery of the axle 152. Similarly, at point 155 where the diameter is twelve units, the point is spaced four units from the axle. The corresponding values, viz, 2, 4, 2, 6, 4 and 2, are written laterally of the points 154, 155 . . . 159, respectively. If, now, the grinder or milling cutter 151 rolls with its axle on the rails 140, and 150 so that the axle stays parallel to itself and when it has arrived at a position where its axis a—a is in the same vertical plane with one of the reference lines, e.g. line 111, it will be clear that the grinder circumference extends two units below the rails at the line 111, and as at this line the rails are spaced four units below a horizontal plane corresponding to the base line 101, the grinder circumference at 154 will operate as far down as six units below that reference plane. Similarly, the depth to which the grinder operates at any other point of the wave line 153 can be found. Hence, if the grinder or cutter while rotating is moved by means not shown in the direction of the arrows b from the one to the other end of the rails, a second wave formation according to the wave line 153 will be superimposed on a first wave formation according to wave line 100, wherein the first wave line 100 is in a plane parallel and at right angles to the sides EG and FH, and the second line for all practical considerations is in a plane parallel and at right angles to the side EF and GH. However, while the grinder during its rotation is thus shifted in two directions at right angles to each other and to the axis a—a, a reciprocating movement in a third direction, namely, in the direction of the axis a—a, according to the arrows c, is imparted to the grinder by means not shown. This third movement is in accordance with a third wave line which oscillates in a horizontal plane and of which, as stated hereinbefore, only vertexes connected by straight lines are shown. This third wave line appears as line 160 starting at the point of intersection 161 of the grinder periphery 154 with reference line 107 when the grinder is in its initial position at the left hand end of the area EFGH. There are two vertexes 162 and 163 shown and the end of the wave line 160 is denoted by 164. Now, it will be clear that all other points of the grinder will oscillate on parallel wave lines. Such parallel wave lines 165, 166, 167, 168 and 169 are shown in Fig. 6 for the points 155, 156, 157, 158, 159, respectively, of the second wave line 153. On account of the axial movement of the grinder 151 it is necessary that its grinding surface between 154 and 159 is at least equal to the width EF of the area EFGH plus the maximum amplitude of the third wave line, and the spacing of the rails 140 and 150 from that area, and the lengths of the ends of the axle 152 must be such that the grinder 151 can follow the oscillations of the third wave line 160.

In the foregoing it has been stated that and explained why the grinder with its circumference at 154 will operate to a depth of six units when in the position where its axis a—a is in the same vertical plane with reference line 111. However, as the grinder follows the wave line 160 while moving from its initial position to the reference line 111, the mentioned depth will be attained at the point of intersection 170 of the lines 111 and 160. In a manner similar to that applied with respect to the small areas as for instance 141 of the strip 140, the value of six units has been applied so as to extend towards the left hand side of point 170. The point so established has been denoted by 171, and the value —6 has been marked adjacent said point. In the same manner the value of —8 has been found for the point of intersection 172 of lines 111 and 165, fixing the point 173. Similarly, co-ordinate points 174, 175, 176, 177, have been entered for the points of intersection 178, 179, 180 and 181, respectively. The adjacent points have been connected by straight lines.

Now it will be clear that the total area 170, 171, 177, 181, indicates the depth to which each point of the grinder is capable of operating when its axis and the reference line 111 are in the same plane. Furthermore, the area 182, 183, 185, 184 is an actual cross-section of the concavity of the surface applied to the area EFGH as the points 182 and 184 are located on the line EG and the points 183, 185 are located on the line FH. The same method has been applied to all the reference lines so that the actual shape of the surface created on the area EFGH can be readily recognized. In this connection it will be noted that in the example of Fig. 6 there appear rises above the plane identified by the base line 101 only on the reference lines 126, 127, 128, 129, 130. They are marked with the plus sign of the various values whereas in all the other parts of the area EFGH only depressions of varying depth occur. However, these rises are by no means the only convexities in the area, as e.g. point 174 clearly indicates a convexity in relation to the adjacent concavities at 173 and 175.

A surface according to the invention can be produced by first using a cylindrical grinding roller which, during its rotation, is moved with its axis parallel to itself and to the sides EF and GH of a pane area EFGH from the one to the other one of these sides while simultaneously raising and lowering the axis according to the first wave line, and, then, moving a second roller the same way as the first one, the second roller, however, being formed according to the second wave line and being simultaneously moved transversely of the area EFGH according to the first wave line. However, rather than using the first grinding roller to produce the first wave formation, the pane EFGH may be originally cast, pressed or bent by any conventional and suitable process to be provided with a surface according to the first wave formation, whereupon a grinding roller as the aforementioned second grinding roller may be applied in the described manner. It is, of course, also possible to use in a one step operation only the second grinding roller on an originally plain surface. However, the use of the two step operation of the method described in the foregoing is preferred because thereby the wear of the expensive roller, the circumference of which must be exactly formed according to the second wave line, will be considerably reduced. Another possibility consists in using as a first grinding roller one which is shaped according to the first wave line and to move it with its axis in a horizontal plane and parallel to the sides EG and FH of the area EFGH, but in this event there would be even two expensive profiled grinding rollers, wherefore this method is not recommended.

It will be clear that the width and length of the area may be selected as desired, and that in each of the wave lines portions may be repeated or that a wave line varies in shape throughout from the one end to the other one.

If, now the image of a stationary object body, correctly spaced from a pane having a surface as hereinbefore explained, is looked at while the pane is moving even in one linear direction only at a constant distance of the body from the basic plane of the pane not only strips but all parts and points of the body image will alternately shrink and swell at varying rates.

This effect can be further varied and multiplied if panes according to the invention are moved in relation to the observed body, rather than in a straight line, either on curves so as to shift simultaneously in a horizontal and a vertical direction or so that the pane rotates.

Thus, Fig. 7, shows a structure according to which the total pane consists of pane sections endlessly linked together like a chain and being guided about and by two vertical drums of polygonal cross-section spaced from one another. In this figure, each two adjacent pane sections 200 are hinged together at 201, and the chain formed by all the pane sections 200 surrounds half of each of the vertical drums 202 and 203 which are rotatable about their axes 204 and 205, respectively. If the drum 202 is driven to turn about its axis in the direction of the arrow e, the panel sections 200 which are in front of an object 206 and the observer's eye 207 will move in the direction of the arrow f, and the image of the object body will appear to move as to all its parts and points on the pane surfaces 208 provided they are shaped as hereinbefore described. Of course, where a pane section abuts the adjacent one, the pane sections should fit one another so that there is a smooth continuity of the wave formation.

Structures are also conceivable whereby the chain of panel sections 200 is moved up and down while they move as in Fig. 7 in the direction of the arrow f. In order to accomplish this, the drums 202 and 203 are secured with their axes to the axes 209 and 210 of two synchronously running prime movers 211 and 212, respectively. The prime movers with the associated drums are carried at the ends of a bar 213. The bar is supported in its middle by a plunger 214 which is vertically movable within a hydraulic or pneumatic cylinder 215. When pressure fluid will be admitted from a source as shown to the cylinder via a pipe 216 with a control valve 217, the bar 213 and with it the rotating drums with the chain of pane sections will be raised, and when the pressure fluid is discharged from cylinder 215, the bar and all associate parts will be lowered. In this manner, the movement of the pane sections in front of an observed object body can be composed of a horizontal and a vertical component.

It will be apparent that many alterations and modifications of the structure shown and described as well as of the method discussed hereinbefore will be possible without departure from the essence and spirit of the invention which for that reason shall not be limited but by the scope of the appended claims.

I claim:

1. A device for creating a disproportioned but sharp reflected image of a person, comprising a non-transparent, reflecting pane having a waved surface, said surface being so shaped as to include a first and a second wave formation, each wave formation including parallel waves of different lengths and amplitudes, the wave line of said first wave formation at right angles to the direction in which its waves extend being composed of a plurality of alternating concave and convex segments of conic sections, each of said segments containing the vertex of its conic section with the axis thereof at right angles to the tangent at the vertex wherein all said axes of said conic sections are parallel to each other, each pair of adjacent segments having a common tangent of a length between zero and the focal length of the concave segment of said pair, said second wave formation being superimposed on said first mentioned wave formation, the wave line of said second wave formation being of the type of the wave line of the first formation, and being in a plane at right angles to the plane of the wave line of said first wave formation, wherein the parallel waves of said first wave formation extend straight-lined and the parallel waves of the second wave formation extend according to a third wave line in a plane at right angles to the planes of said first and second wave lines.

2. A device for creating a disproportioned but sharp reflected image of a person, comprising a non-transparent, reflecting pane having a waved surface, said surface being so shaped as to include a first and a second wave formation, each wave formation including parallel waves of different lengths and amplitudes, said second wave formation being superimposed on said first wave formation, the wave lines of said wave formations being in planes at right angles to each other, and being characterized first, in that each wave line is composed of alternating concave and convex segments of conic sections, second, that each segment includes the vertex of its conic section with the axis thereof at right angles to the tangent at said vertex, third, that all said axes are parallel to each other, fourth, that each pair of adjacent segments has a common tangent of a length between zero and the focal distance of the concave segment of said pair, and fifth, that the focal length of that one of said concave segments which has the smallest focal length is larger than 2.1 times the object distance from the vertex of said segment having said smallest focal length, wherein the parallel waves of one of said wave formations extend straight lined and the parallel waves of the other wave formation extend according to a third line in a plane at right angles to the planes of said first and second wave lines.

References Cited in the file of this patent

UNITED STATES PATENTS

| | | |
|---|---|---|
| 13,615 | Geetz | Oct. 2, 1855 |
| 835,638 | Ritchel | Nov. 13, 1906 |
| 1,041,329 | Mygatt | Oct. 15, 1912 |
| 1,103,631 | Stott | July 14, 1914 |
| 1,166,515 | Floessell | Jan. 4, 1916 |
| 2,044,620 | Matthai | June 16, 1936 |
| 2,479,204 | Buchele | Aug. 16, 1949 |
| 2,480,031 | Kellogg | Aug. 23, 1949 |
| 2,804,801 | Mihalakis | Sept. 3, 1957 |